(12) United States Patent
Agardh et al.

(10) Patent No.: US 9,491,679 B2
(45) Date of Patent: Nov. 8, 2016

(54) NETWORK HANDOVER OPTIMIZATION

(71) Applicant: Sony Corporation, Tokyo (JP)

(72) Inventors: Kåre Agardh, Lund (SE); Lars Nord, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/394,667

(22) PCT Filed: Dec. 16, 2013

(86) PCT No.: PCT/IB2013/002758
§ 371 (c)(1),
(2) Date: Oct. 15, 2014

(87) PCT Pub. No.: WO2015/092456
PCT Pub. Date: Jun. 25, 2015

(65) Prior Publication Data
US 2016/0066244 A1    Mar. 3, 2016

(51) Int. Cl.
| | | |
|---|---|---|
| H04W 36/00 | (2009.01) | |
| H04W 36/32 | (2009.01) | |
| G01S 19/48 | (2010.01) | |
| G01S 5/00 | (2006.01) | |
| H04W 36/24 | (2009.01) | |
| H04W 64/00 | (2009.01) | |

(52) U.S. Cl.
CPC ............. *H04W 36/32* (2013.01); *G01S 5/00* (2013.01); *G01S 19/48* (2013.01); *H04W 36/245* (2013.01); *H04W 64/006* (2013.01)

(58) Field of Classification Search
CPC ..... H04W 36/32; H04W 4/02; H04W 64/00; H04W 28/26; H04W 36/0083; H04W 36/08; H04W 36/245; H04W 64/006; H04W 84/005; H04W 24/04; H04W 36/0072; H04W 36/0077; H04W 36/18; H04W 4/028; H04W 92/20
USPC .......................................................... 455/436
See application file for complete search history.

(56) References Cited

U.S. PATENT DOCUMENTS

| | | | |
|---|---|---|---|
| 2010/0323715 A1 | 12/2010 | Winters | |
| 2010/0330991 A1* | 12/2010 | Sydir | G01C 21/3461 455/436 |
| 2011/0310865 A1 | 12/2011 | Kennedy et al. | |

(Continued)

FOREIGN PATENT DOCUMENTS

| | | |
|---|---|---|
| WO | 9528813 A1 | 10/1995 |
| WO | 9956476 A1 | 11/1999 |
| WO | 2013175048 A1 | 11/2013 |

OTHER PUBLICATIONS

International Search Report and Written Opinion; Sep. 8, 2014, issued in International Patent Application No. PCT/IB2013/002758.

(Continued)

*Primary Examiner* — Kwasi Karikari
(74) *Attorney, Agent, or Firm* — James C. Edwards; Moore & Van Allen PLLC

(57) ABSTRACT

The invention is directed to systems, methods and computer program products for managing handover of a terminal on a network. An exemplary method comprises: receiving sensor data associated with the terminal; receiving time data associated with the terminal; predicting a journey of the terminal based on at least one of the sensor data and the time data; generating a mobility map based on the predicted journey; and transmitting the mobility map to the network.

19 Claims, 1 Drawing Sheet

(56) References Cited

U.S. PATENT DOCUMENTS

2013/0308470 A1* 11/2013 Bevan ............... H04W 64/00
                                                  370/252
2014/0066074 A1*  3/2014 Folke ............... H04W 36/08
                                                  455/437

OTHER PUBLICATIONS

International Preliminary Report on Patentability; Jun. 30, 2016; issued in International Patent Application No. PCT/IB2013/002758.

* cited by examiner

NETWORK HANDOVER OPTIMIZATION

BACKGROUND ART

The control plane is part of the network infrastructure that is concerned with the formation and management of the network. Minimizing the traffic in the control plane is becoming more important as congestion in a network increases. Therefore, there is a need to reduce the traffic in the control plane.

SUMMARY

Embodiments of the invention are directed to systems, methods and computer program products for managing handover of a terminal on a network. An exemplary method comprises: receiving sensor data associated with the terminal; receiving time data associated with the terminal; predicting a journey of the terminal based on at least one of the sensor data and the time data; generating a mobility map based on the predicted journey; and transmitting the mobility map to the network.

In some embodiments, the method further comprises determining the terminal is in high mobility mode based on the mobility map.

In some embodiments, the terminal is in high mobility mode if a number of handovers to be executed during the journey, predicted by the mobility map, is equal to or greater than a threshold number of handovers.

In some embodiments, the network determines at least one of the threshold number of handovers, a timing associated with a handover of the terminal, or a base station to which the terminal's data or voice session is handed over.

In some embodiments, the method further comprises transmitting the mobility map comprises transmitting a link to the mobility map.

In some embodiments, the mobility map is transmitted via a navigation server.

In some embodiments, if a terminal is determined to be in high mobility mode the network assigns the terminal to a macrocell (e.g., a particular base station) upon receiving a first handover request associated with the terminal.

In some embodiments, the sensor data comprises movement data from an accelerometer, a gyro, a compass or other sensor that can provide relevant movement data.

In some embodiments, the method further comprises receiving location data, and generating the mobility map based on the location data.

In some embodiments, the location data is received using a positioning system (e.g., global positioning system (GPS), network location system, etc.) associated with the terminal.

In some embodiments, the predicting step is based further on movement history associated with the terminal. The movement history is captured by the terminal over a period of time and stored in the terminal or at a cloud server accessible by the terminal.

In some embodiments, the mobility map further includes network coverage information and signal strength information.

In some embodiments, the mobility map comprises a geographical map.

In some embodiments, the terminal comprises at least one of a mobile computing device, a mobile phone, a television, a watch, or a tablet computing device.

In some embodiments, the network comprises at least one base station.

In some embodiments, multiple mobility maps are associated with the terminal, and the multiple mobility maps are differentiated based on at least one of the time data or the sensor data.

In some embodiments, multiple mobility maps are associated with the terminal, and wherein the multiple mobility maps are differentiated based on local or remote information.

In some embodiments, use of the mobility map to determine if the terminal is in high mobility mode is triggered based on whether an application being executed on the terminal is associated with a power level equal to or greater than a threshold power level.

In some embodiments, the mobility map is generated based on local and remote information sources.

In some embodiments, an apparatus is provided for managing handover of a terminal on a network. The apparatus comprises: a memory; a processor; and a module stored in the memory, executable by the processor, and configured to: receive sensor data associated with the terminal; receive time data associated with the terminal; predict a journey of the terminal based on at least one of the sensor data and the time data; generate a mobility map based on the predicted journey; and transmit the mobility map to the network.

In some embodiments, a computer program product is provided for managing handover of a terminal on a network. The computer program product comprises a non-transitory computer-readable medium comprising a set of codes for causing a computer to: receive sensor data associated with the terminal; receive time data associated with the terminal; predict a journey of the terminal based on at least one of the sensor data and the time data; generate a mobility map based on the predicted journey; and transmit the mobility map to the network.

BRIEF DESCRIPTION OF DRAWINGS

Figure 1:
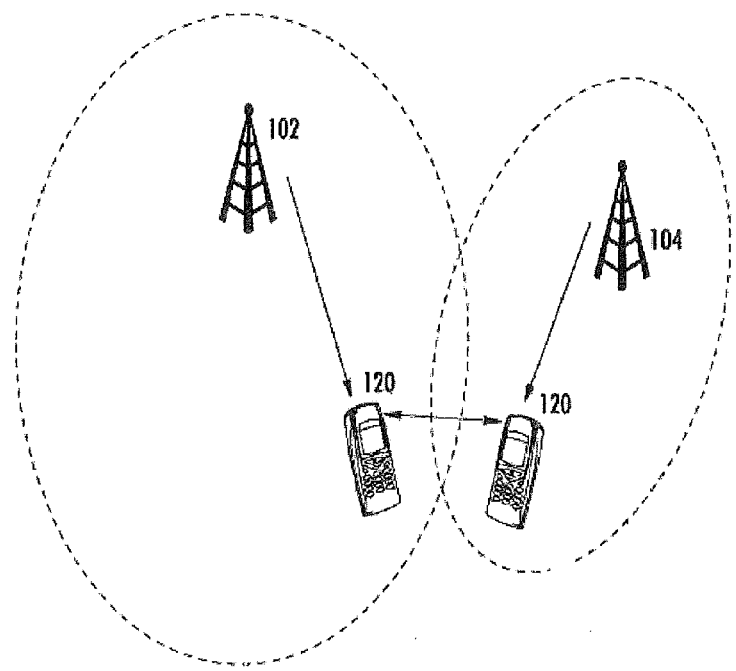
Figure 2:
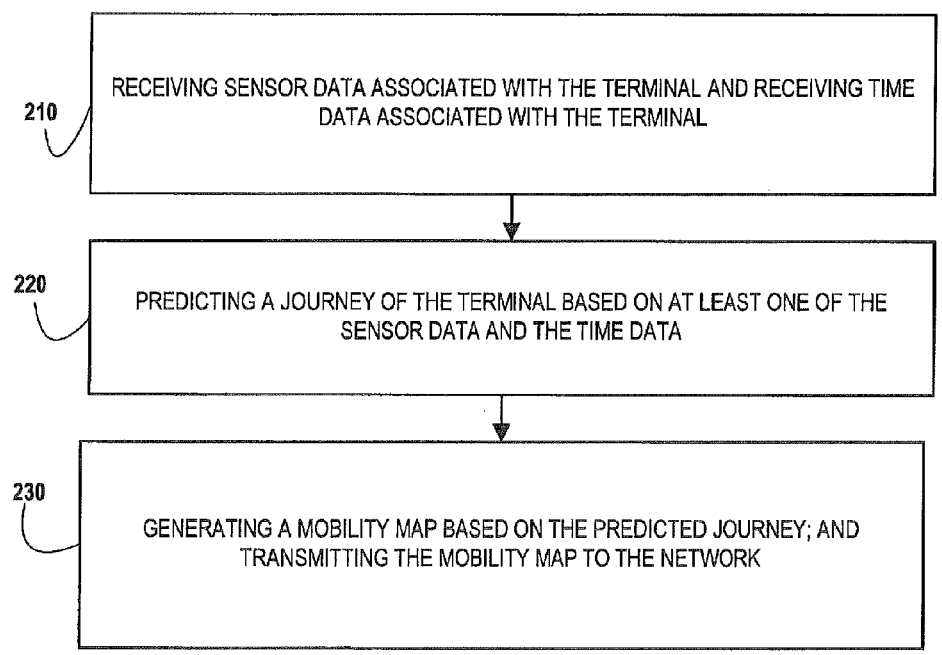

Having thus described embodiments of the invention in general terms, reference will now be made to the accompanying drawings, where:

FIG. 1 is an exemplary network environment for managing handover of a terminal on a network, in accordance with embodiments of the present invention; and FIG. 2 is an exemplary process flow for managing handover of a terminal on a network, in accordance with embodiments of the present invention.

DESCRIPTION OF EMBODIMENTS

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

The present invention is directed to coordinating network handover based on information associated with mobility maps and other contextual data (time data, sensor data, location data) associated with user equipment (UE).

A wireless infrastructure network (such as a cellular or Wi-Fi network) maintains certain information about a UE connected to the network. As used herein, a UE may also be referred to as a terminal or a node. Today, this information is limited to link metrics and handover history. Link metrics refer to any value used by routing protocol to determine whether one particular route in a network should be used over another route for data transmission or reception. Handover may refer to how the UE connects to the network via a base station. Therefore, as a UE makes geographical moves, the UE connects to the network via different base stations. Therefore, as the UE makes geographical moves, the UE's ongoing data or voice session is transferred from one base station to another base station. The history of how the UE connects to the network via different base stations may also be referred to as the handover history. Based on this information, the network makes decisions as to which base station the network will instruct or request the UE for executing a handover. Additional signaling traffic between the UE and network infrastructure (e.g., the base station and/or other UEs connected to the network) as well as other data exchange with the network backbone is needed with each handover.

The control plane is a limited resource in some cases. As used herein, the control plane is part of the network infrastructure that is concerned with the formation and management of the network, or information in a routing table that defines how to handle incoming or outgoing data packets. Minimizing the data traffic in the control plane is becoming more important as congestion on a network increases. The network can make better decisions with respect to handover if the network has some of the information that the UE has.

Consider a scenario when a UE has high mobility (e.g., mobility equal to or greater than a threshold mobility) within the network. In this scenario, the network will ask the UE to make handovers to neighboring cells (or base stations) as the UE travels through the area associated with the network. However after a certain amount of handovers, which may be referred to as the threshold number of handovers or a predetermined threshold number of handovers, the UE is defined as a high mobility UE and might be requested to make a handover to a macrocell, an umbrella cell that serves a larger area. The threshold number of handovers may be predetermined or predicted by the network, for example by using the mobility map. If the UE has a predicted mobility map and could provide this map to the network, then the network could assign the UE to a macrocell upon occurrence of the first handover request. This would minimize the amount of control traffic needed for this high mobility UE. The present invention is directed to minimizing the amount of control traffic for a high mobility UE. To accomplish this, as described above, the network may determine at least one of the threshold number of handovers, a timing associated with a handover of the terminal, or a base station to which the terminal's data or voice session is handed over.

The UE has many ways of predicting or generating a mobility map. In some embodiments, the mobility map comprises a geographical mobility map. In some embodiments, this prediction can be made using navigation services. In other embodiments, this prediction could be made by analyzing UE behavior over a period of time and determining the type of activity being executed by the UE. For example, Person A commutes to work by train and bus. Person A makes this journey every morning and evening from Monday to Friday. Naturally, Person A will not use a navigation service for his daily trip because he has become accustomed to this trip. The UE associated with Person A has the capability to detect the beginning and ending of the trip by using sensor (accelerometer) data, time data, and location data. The sensor(s) in the UE can analyze the UE movement (accelerometer data) and audio input into the UE to distinguish among various forms of commute (e.g., train, bus, car, motorcycle, bicycle, walk, run, etc.). In some embodiments, data from a sensor includes data from an accelerometer, a gyro, a compass, a positioning system or other sensor that can provide relevant movement data.

In some embodiments, the sensor data, time data, and location data may be used to determine parameters (e.g., start time, duration, end time, starting location, ending location, etc., which comprise movement history) associated with the commute. For example, when the UE detects "train activity" in the morning, the UE consequently determines that the user's commute to work has begun. As a further example, when the UE detects "bus activity" in the evening, the UE consequently determines that the user's commute to the user's home from work has begun. Since the route taken by the user each day is substantially the same, the UE can create a mobility map that can be shared with the network. In some embodiments, the mobility map can be used to generate a geographical map of the user's commute. Over time the user can build up multiple mobility maps based on the user's behaviors or movement history.

In some embodiments, users are provided with the ability to have multiple mobility maps. The maps are differentiated by time, day, calendar data and/or sensor data. For example, a user's commute to work on Monday, Tuesday, and Wednesday comprises a first map. The user's commute to work on Wednesday and Thursday comprises a second map. The user's drive to soccer practice on certain days comprises a third map. The user's drive to music lessons on certain days comprises a fourth map. The user's drive to meet the user's parents or grandparents on Sundays comprises a fifth map. The UE and/or the network determines which mobility map to use based on time data and/or sensor data and, thus, uses the user's movement history to predict a journey of the terminal. The UE and/or the network can further help determine which mobility map to use based on local and/or remote information. In some embodiments, the use of the mobility map is triggered when other power-hungry applications (e.g., associated with a power level equal to or greater than a predetermined power level (or alternatively referred to as a threshold power level or a predetermined threshold power level)) are being executed on the UE. An exemplary power-hungry application may be the use of GPS functionality on the UE. The data associated with, or used to generate, the mobility maps may be obtained from any UE information sources, either local or remote to the UE. In some embodiments, the mobility map includes network coverage information and/or signal strength information.

There are several ways to share the UE's mobility map with the network. In some embodiments, the UE shares the mobility map with the network via a navigation server. This minimizes the amount of data transmitted and/or received between the UE and the network backbone. The UE indicates to the network that it is in high mobility mode based on predicting or determining the UE activity, and shares a uniform resource locator (URL) to the mobility map. Therefore, the present invention enables the network to use the mobility map provided by the UE to improve the utilization of the network as the UE travels through the network. In other embodiments, the mobility map may be transmitted by transmitting a link to the mobility map.

Referring now to FIG. 1, FIG. 1 presents an exemplary network environment for managing a handover. Terminal 120 moves in the network from a location near base station 102 to a location near base station 104. As terminal 120 moves to the location near base station 104, the network conducts a handover such that information associated with the terminal's voice or data session is transmitted from base station 102 to base station 104.

Referring now to FIG. 2, FIG. 2 presents an exemplary process flow for managing a handover. At block 210, the process flow comprises receiving sensor data associated with the terminal and receiving time data associated with the terminal. At block 220, the process flow comprises predicting a journey of the terminal based on at least one of the sensor data and the time data. At block 230, the process flow comprises generating a mobility map based on the predicted journey, and transmitting the mobility map to the network. In some embodiments, the process flow further comprises determining the terminal is in high mobility mode based on the mobility map. In some embodiments, the process flow further comprises receiving location data, and generating the mobility map based further on the location data. In some embodiments, the process flow further comprises making predictions based on the movement history of the terminal.

The terminal described herein comprises at least one of a mobile computing device, a mobile phone, a television, a watch, or a tablet computing device. The terminal (and/or base station associated with the network) comprises a processor, a memory, and a module stored in the memory, executable by the processor, and configured to perform the various processes described herein. The processor described herein generally includes circuitry for implementing audio, visual, and/or logic functions. For example, the processor may include a digital signal processor device, a microprocessor device, and various analog-to-digital converters, digital-to-analog converters, and other support circuits. The processor may also include functionality to operate one or more software programs based at least partially on computer-executable program code portions thereof, which may be stored, for example, in a memory.

The memory may include any computer-readable medium. For example, the memory may include volatile memory, such as volatile random access memory (RAM) having a cache area for the temporary storage of information. The memory may also include non-volatile memory, which may be embedded and/or may be removable. The non-volatile memory may additionally or alternatively include an EEPROM, flash memory, and/or the like. The memory may store any one or more of pieces of information and data.

Any function or process that is described as being performed by the network may be performed by the terminal, and any function or process that is described as being performed by the terminal may be performed by the network. Any function or process that is described as being performed by the network may be performed by a base station of the network, the network infrastructure, or the network backbone associated with the network. The various features described with respect to any embodiments described herein are applicable to any of the other embodiments described herein. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

The invention claimed is:

1. A method for managing handover of a terminal on a wireless network, the method comprising:
   receiving, by a processor device, sensor data from one or more sensors, wherein the sensor data includes at least location data and time data associated with the terminal;
   determining, by the processor device, a predicted travel route of the terminal and a predicted time for the terminal to be on the predicted travel route based on the sensor data;
   generating, by the processor device, a mobility map that includes the predicted travel route of the terminal and the predicted time; and
   transmitting the mobility map from the terminal to the wireless network, wherein the wireless network uses the mobility map to determine when the terminal will be in a high mobility mode that is defined by occurrence of a predetermined threshold number of handovers during a predetermined time period based on the predicted travel route from the mobility map, wherein determination of when the terminal is in a high mobility mode provides for the wireless network to manage handovers of the terminal during the high mobility mode so as to minimize an amount of control data traffic between the terminal and the wireless network.

2. The method of claim 1, wherein the wireless network uses the mobility map to determine when the terminal will be in high mobility mode based on a number of handovers to be executed during the predicted travel route being equal to or greater than the predetermined threshold number of handovers.

3. The method of claim 1, wherein the wireless network further uses the mobility map to determine at least one of, a timing associated with one or more handovers of the terminal during the predicted travel route, or one or more cells or base stations to which the terminal's data or voice session is handed over during the predicted travel route.

4. The method of claim 1, wherein transmitting the mobility map comprises transmitting, from the terminal to the wireless network, a link to the mobility map.

5. The method of claim 1, wherein transmitting the mobility map further comprises transmitting the mobility map from the terminal to a navigation server, wherein the navigation server is accessible to the wireless network.

6. The method of claim 1, wherein in response to the wireless network determining that the terminal is in high mobility mode, assigning the terminal to a macrocell upon receiving a first handover request associated with the terminal during the predicted travel route.

7. The method of claim 1, wherein the sensor data comprises movement data from an accelerometer, a gyro, a compass or other sensor that can provide relevant movement data.

8. The method of claim 1, wherein the location data is received using a positioning system associated with the terminal.

9. The method of claim 1, wherein the determining step is based further on movement history associated with sensor data acquired over time by the one or more sensors inal.

10. The method of claim 1, wherein the mobility map further includes network coverage information and signal strength information.

11. The method of claim 1, wherein the mobility map comprises a geographical map.

12. The method of claim 1, wherein the terminal comprises at least one of a mobile computing device, a mobile phone, a television, a watch, or a tablet computing device.

13. The method of claim 1, wherein the network comprises at least one base station.

14. The method of claim 1, wherein generating further comprises generating multiple mobility maps, wherein the multiple mobility maps are differentiated based on at least one of the time data, the location data or the sensor data.

15. The method of claim 1, wherein generating further comprises generating multiple mobility maps, wherein the multiple mobility maps are differentiated based on local or remote information.

16. The method of claim 1, wherein use of the mobility map to determine when the terminal is in high mobility mode is triggered based on an application being executed on the terminal requiring a power level equal to or greater than a threshold power level.

17. The method of claim 1, wherein generating further comprises generating the mobility map based on local and remote information sources.

18. An apparatus for managing handover of a terminal on a wireless network, the apparatus comprising:
 a memory;
 a processor in communication with the memory;
 one or more sensors in communication with the processor; and
 a module stored in the memory, executable by the processor, and configured to:
  receive sensor data from the one or more sensors, wherein the sensor data includes at least location data and
  time data associated with the terminal,
  determine a predicted travel route of the terminal and a predicted time for the terminal to be on the predicted travel route based on the sensor data,
  generate a mobility map that includes the predicted travel route of the terminal and the predicted time, and
  transmit the mobility map from the terminal to the wireless network, wherein the wireless network uses the mobility map to determine when the terminal will be in a high mobility mode that is defined by occurrence of a predetermined threshold number of handovers during a predetermined time period based on the predicted travel route from the mobility map, wherein determination of when the terminal is in a high mobility mode provides for the wireless network to manage handovers of the terminal during the high mobility mode so as to minimize an amount of control data traffic between the terminal and the wireless network.

19. A computer program product for managing handover of a terminal on a network, the computer program product comprising:
 a non-transitory computer-readable medium comprising a set of codes for causing a computer to:
  receive sensor data from the one or more sensors, wherein the sensor data includes at least location data and
  time data associated with the terminal;
  determine a predicted travel route of the terminal and a predicted time for the terminal to be on the predicted travel route based on the sensor data;
  generate a mobility map that includes the predicted travel route of the terminal and the predicted time; and
  transmit the mobility map from the terminal to the wireless network, wherein the wireless network uses the mobility map to determine when the terminal will be in a high mobility mode that is defined by occurrence of a predetermined threshold number of handovers during a predetermined time period based on the predicted travel route from the mobility map, wherein determination of when the terminal is in a high mobility mode provides for the wireless network to manage handovers of the terminal during the high mobility mode so as to minimize an amount of control data traffic between the terminal and the wireless network.

* * * * *

UNITED STATES PATENT AND TRADEMARK OFFICE
CERTIFICATE OF CORRECTION

| | |
|---|---|
| PATENT NO. | : 9,491,679 B2 |
| APPLICATION NO. | : 14/394667 |
| DATED | : November 8, 2016 |
| INVENTOR(S) | : Kåre Agardh et al. |

It is certified that error appears in the above-identified patent and that said Letters Patent is hereby corrected as shown below:

In the Claims

Column 8, Line 49, remove the text "inal".

Signed and Sealed this
Tenth Day of January, 2017

Michelle K. Lee
*Director of the United States Patent and Trademark Office*